United States Patent Office 3,647,807
Patented Mar. 7, 1972

3,647,807
N-ALKYL-1,4-DIHYDROPYRIDINES
Friedrich Bossert, Wuppertal-Elberfeld, and Wulf Vater, Opladen, Germany, assignors to Farbenfabriken Bayer Aktiengesellschaft, Leverkusen, Germany
No Drawing. Filed Nov. 28, 1969, Ser. No. 880,946
Claims priority, application Germany, Dec. 7, 1968, P 18 13 436.6
Int. Cl. C07d 31/36
U.S. Cl. 260—295.5 R       37 Claims

ABSTRACT OF THE DISCLOSURE

New 1,4-dihydropyridine derivatives are provided having beneficial effects as coronary dilators and spasmolytics. A representative compound is 1,2,6-trimethyl-4-(α-pyridyl)-1,4-dihydropyridine-3,5-dicarboxylic acid dimethyl ester having typical charactertistics of the new compounds.

---

It is known that increasingly strong and serious disturbances of the coronary blood supply can lead to diseases of the circulatory system such as coronary insufficiency, especially angina pectoris which is painful and often progressively grave. Conventional commercial preparations such as nitrites or nitroglycerin while helpful have not always provided alleviation or satisfactory treatment and although they are widely used they have recognized limitations and disadvantages. There has therefore been numerous attempts to find better preparations without much success. It is the object of this invention to provide new and better preparations which in animal tests have shown good ability to cause coronary artery dilation at low dosage. The new compounds also possess spasmolytic activity.

It has now been found according to the present invention that 1,4-dihydropyridine derivatives of the formula:

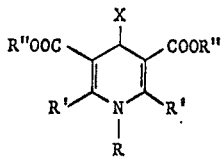

in which
R is a branched or straight-chain alkyl radical with 1 to 3 carbon atoms; or such radical containing a double or triple bond and unsubstituted or substituted by a hydroxy or alkoxy group; or a benzyl radical; or a benzyl radical substituted in the nucleus by substituents such as halogen and/or alkyl and/or alkoxy;
R' is a hydrogen atom or a branched or straight-chain alkaly radical with 1 to 3 carbon atoms;
R" is a branched or straight-chain, saturated or unsaturated alkyl radical with 1 to 6 carbon atoms, or such radical interrupted by one or more oxygen atoms and/or substituted by hydroxy groups; and
X is an aryl radical which is substituted by at least one nitro or amino group and may be substituted by further halogen atoms and/or alkyl and/or alkoxy and/or hydroxy groups, or is an α-, β- or γ-pyridyl radical, have therapeutic properties which are very valuable for the beneficial treatment of disturbances of the coronary blood supply.

After intravenous or oral application, the new compounds give rise to a noticeably persistent dilation of the coronary vessels and in this respect they are superior to comparable or available commercial products. The new compounds also have good spasmolytic properties. They are formulated for use with conventional carriers.

The new compounds are prepared by condensing an aldehyde of the formula:

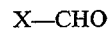

in which X has the above stated meaning,
with an acyl-fatty acid ester of the formula:

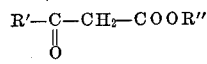

in which R' and R" have the above stated meanings,
and with an amine of the formula:

R—NH₂ in which R has the above stated meaning.

A modifiction of the process consists in condensing, instead of an acyl-fatty acid and amine as stated above, a corresponding aminocrotonic acid ester which is substituted on the amino group and which corresponds to the formula:

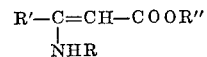

in which R, R' and R" have the above stated meanings, with one of the aforesaid aldehydes.

Amino-substituted derivatives are obtained by reduction of the corresponding nitro compounds obtained by the aforesaid methods.

Illustrative reactants for use in preparing the new compounds include the following:

Aldehydes: α-pyridinaldehyde, β-pyridinaldehyde and γ-pyridinaldehyde; 2-nitrobenzaldehyde, 3-nitrobenzaldehyde and 4-nitrobenzaldehyde; 3-nitro-4-chlorobenzaldehyde, 3-nitro-6-chlorobenzaldehyde, 2-nitro-4-chlorobenzaldehyde, 2-nitro-6-bromobenzaldehyde, 2-nitro-3-methoxy-6-chlorobenzaldehyde, 2-nitro-3-hydroxy-4-chlorobenzaldehyde, 2-nitro-4-methoxybenzaldehyde, 3-nitro-4-hydroxybenzaldehyde and 2,6-dinitrobenzaldehyde.

Esters: formyl acetic acid ethyl ester, acetoacetic acid ester, acetoacetic acid methyl ester, acetoacetic acid ethyl ester, acetoacetic acid propyl ester, acetoacetic acid isopropyl ester, acetoacetic acid propargyl ester, acetoacetic acid-(α- or β)-hydroxyethyl ester, acetoacetic acid-(α- or β)-methoxyethyl ester, acetoacetic acid (α- or β)-ethoxyethyl ester, acetoacetic acid-(α- or β)-propoxyethyl ester.

Amines: methylamine, ethylamine, isopropylamine, allylamine, propargylamine, 1-hydroxyethylamine-1,1-hydroxyethylamine-2,1,3-dihydroxy-isopropylamine, benzylamine, 4-chlorobenzylamine, 3,4-dimethoxybenzylamine.

A further process for preparing the new compounds of the invention consists in treating a quaternary pyridinium salt of the formula:

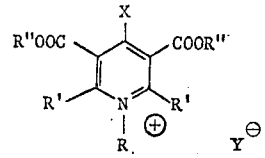

in which R, R', R" and X have the above stated meanings and Y is an anion, in a manner per see known with a reducing agent.

The most important pharmacological data are given below for a representative compound which is characteristic of all the claimed compounds, i.e., 1,2-6-trimethyl-4-(α-pyridyl)-1,4-dihydropyridine-3,5-dicarboxylic acid dimethyl ester (Example 10).

Toxicity.—DL 50: mice i.v.—79.7 mg./kg., mice p.o. approx.—300.0 mg./kg., mice i.p. approx.—210.0 mg./kg.

Blood pressure in rats: strong increase of blood pressure with 10 mg./kg. i.v. The initial value was not yet reached again after 20 minutes. Reduced adrenaline effect.

Coronary effect in dogs (heart catheterized):

Oxygen pressure: narcosis: urethane-chloralose; strong increase with 50 mg./kg. p.o.; return to initial value after 5 hours.

Oxygen saturation: narcosis: phanodorm; in three experiments slight increase with 3 mg./kg. i.v.; the initial value was not yet reached again after 3½ hours; in eight experiments slight to marked increase with 5 mg./kg.; in four experiments the initial value was again reached after 3 hours, in four experiments it was not yet reached after 4 hours.

Blood pressure (dogs): slight variations.
Frequency (dogs): no appreciable change.

The invention is illustrated by the following non-limitative examples.

EXAMPLE 1

1,2,6-trimethyl-4-(2'-nitrophenyl)-1,4-dihydropyridine-3,5-dicarboxylic acid dimethyl ester (1) 2-nitrobenzaldehyde, 30 ml. of acetoacetic acid methyl ester and 6 ml. of a solution of methylamine in 100 ml. of methanol are heated under reflux for several hours, the mixture is filtered after the addition of animal charcoal, cooled, and 12 g. of yellow crystals of M.P. 168° to 170° C. are obtained after filtering off with suction.

Coronary dilating effect obtained with 0.5 mg./kg. i.v. and 5 mg./kg. p.o.

(a) melting point of the diethyl ester 131° to 134° C.; coronary dilating effect obtained with 0.02 to 2 mg./kg. i.v.; good spasmolytic effect.

(b) melting point of the β-hydroxydiethyl ester 110° C.;

(c) 1 - ethyl-2,6-dimethyl-4-(2'-nitrophenyl)-1,4-dihydropyridine - 3,5 - dicarboxylic acid dimethyl ester, M.P. 146° C.

(2) After oxidation of the 2,6-dimethyl-4-(2'-nitrophenyl)-1,4-dihydropyridine-3,5-dicarboxylic acid diethyl ester (M.P. 124° C.) with dilute nitric acid or sodium nitrite is glacial acetic acid to form the 2,6-dimethyl-4-(2'-nitrophenyl) - pyridine-3,5-dicarboxylic acid diethyl ester (M.P. 93° to 94° C., benzene/ligroin), the oxidation product is quaternized by prolonged heating with dimethyl sulphate in a water bath, and the quaternary ammonium compound is subsequently reduced with a solution of sodium hydrosulphite in water to form the 1,2,6-trimethyl-4-(2'-nitrophenyl) - 1,4-dihydropyridine-3,5-dicarboxylic acid diethyl ester of M.P. 133° C.

EXAMPLE 2

1,2,6-trimethyl-4-(3'-nitrophenyl)-1,4-dihydropyridine-3,5-dicarboxylic acid diethyl ester A solution of 15 g. of 3-nitrobenzaldehyde, 30 g. of α-methylamino-crotonic acid ethyl ester in 200 ml. of glacial acetic acid is heated under reflux for one hour, then poured into water and allowed to stand overnight; 25 g. of pale yellow crystals of M.P. 95° C. are obtained benzaldehyde melts as 95° C.; coronary dilating effect from methanol.

The compound obtained in the same way with 4-nitro-obtained with 0.1 to 1.0 mg./kg. i.v.

The following compounds were similarly prepared:

(a) 1,2,6 - trimethyl-4-(4'-nitrophenyl)-1,4-dihydropyridine-3,5-dicarboxylic acid methyl ester of M.P. 160° C.; coronary dilating effect with 5 mg./kg. i.v.

(b) 1,2,6 - trimethyl-4-(3'-nitrophenyl)-1,4-dihydropyridine-3,5-dicarboxylic acid-di-(β-propoxethyl ester) of M.P. 54° C.; coronary effect with 1 mg./kg. i.v.

(c) 1,2,6 - trimethyl-4-(2'-nitrophenyl)-1,4-dihydropyridine - 3,5 - dicarboxylic acid-di-(β-propoxyethyl ester) (oil); coronary effect with 1 to 3 mg./kg. i.v.

(d) 1 - isopropyl-2,6-dimethyl-4-(2'-nitrophenyl)-1,4-dihydropyridine-3,5-dicarboxylic acid dimethyl ester of M.P. 187° C.; coronary effect with 3 mg./kg. i.v.

EXAMPLE 3

1-benzyl-2,6-dimethyl-4-(3'-nitro-6-chloro)-1,4-dihydropyridine-3,5-dicarboxylic acid diethyl ester 185 g. (1 mol) of 3-nitro-6-chloro-benzaldehyde are heated with 270 ml. of acetoacetic acid ethyl ester and 107 g. of benzylamine in 400 ml. of alcohol at boiling temperature overnight, the mixture is suction-filtered, and after prolonged standing there are obtained 246 g. of yellow crystals of M.P. 120° to 122° C.; brief coronary dilating effect obtained with 3 to 10 mg./kg. i.v.

The 1 - benzyl-2,6-dimethyl-4-(4'-nitrophenyl)-1,4-dihydropyridine-3,5-dicarboxylic acid diethyl ester of M.P. 100° to 102° C. is obtained in the same way (golden yellow crystals); brief coronary dilating effect obtained with 1 to 10 mg./kg. i.v.

EXAMPLE 4

1-benzyl-2,6-dimethyl-4-(4'-aminophenyl)-1,4-dihydropyridine-3,5-dicarboxylic acid diethyl ester After heating 120 g. of 1-benzyl-2,6-dimethyl-4-(4'-nitrophenyl) - 1,4-dihydropyridine-3,5-dicarboxylic acid diethyl ester (M.P. 100° to 102° C.) in 400 ml. of water and 400 ml. of chlorobenzene with the addition of 400 g. of iron shavings and 6 ml. of glacial acetic acid for 8 hours, the mixture is filtered with suction, the chlorobenzene layer is separated and the chlorobenzene distilled off in a vacuum. From the residue there are obtained, after recrystallization from acetone/ether, pale-yellow crystals of M.P. 173° to 175° C.

Coronary dilating effect obtained with 10 to 20 mg./kg. i.v.

The same compound is also obtained by catalytic reduction with Raney nickel in ethanol.

EXAMPLE 5

1-(β-hydroxyethyl)-2,6-dimethyl-4-(γ-pyridyl)-1,4-dihydropyridine-3,5dicarboxylic acid diethyl ester A solution of 21.4 g. of γ-pyridinaldehyde and 12 ml. of 1-aminoethanol-2 in 52 ml. of acetoacetic acid ethyl ester and 50 ml. of methanol is heated at boiling temperature for several hours, filtered and cooled. After filtering off with suction and washing with ether, white crystals (30 g.) of M.P. 165° C. are obtained. Brief coronary dilating effect obtained with 20 mg./kg. i.v.

1 - (β-hydroxyethyl) - 2,6 - dimethyl-4-(β-pyridyl)-1,4-dihydropyridine-3,5-dicarboxylic acid diethyl ester, M.P. 158° C.; coronary dilating effect obtained with 10 to 20 mg./kg. i.v.

EXAMPLE 6

1-benzyl-2,6-dimethyl-4-(α-pyridyl)-1,4-dihydropyridine-3,5-dicarboxylic acid diethyl ester 21.4 g. of pyridine-2-aldehyde, 52 ml. of acetoacetic ester and 22.6 g. of benzylamine are heated in 60 ml. of methanol at boiling temperature overnight, the mixture is poured into water, extracted with ether and the extract washed with a sodium chloride solution.

After distilling off the ether, there are obtained 24 g. of white crystals of M.P. 112° C. (benzene/ligroin). The 1 - benzyl - 2,6 - dimethyl-4-(α-pyridyl)-1,4-dihydropyridine-3,5-dicarboxylic acid dimethyl ester melts at 180° C. (HCl salt).

(a) The corresponding ditert.-butyric acid ester melts at 166° C.; coronary dilating effect obtained with 3 to 5 mg./kg. i.v.;

(b) 1 - benzyl - 2,6 - dimethyl-4-(γ-pyridyl)-1,4-dihydropyridine-3,5-dicarboxylic acid dimethyl ester, M.P. 182° C.;

(c) diethyl ester, M.P. 198° C.; coronary dilating effect obtained with 15 mg./kg. i.v.;
(d) isopropyl ester, M.P. 146° C.; coronary dilating effect obtained with 10 to 20 mg./kg. i.v.

EXAMPLE 7

1-(3',4'-dimethoxybenzyl)-2,6-dimethyl-4-(β-pyridyl)-1,4-dihydropyridine-3,5-dicarboxylic acid diethyl ester After heating a solution of 10.7 g. of pyridinaldehyde, 16.7 g. of 3,4-dimethoxy-benzylamine and 26 ml. of acetoacetic acid ethyl ester in 25 ml. of alcohol for several hours, the mixture is concentrated by evaporation in a vacuum, the residue taken up with acetone/ether, and the reaction product precipitated as the HCl salt. After recrystallizing twice (from acetone, then from alcohol), there are obtained yellow crystals (30 g.) of M.P. 179° to 181° C.; coronary dilating effect obtained with 5 mg./kg. i.v.

EXAMPLE 8

1,2,6-trimethyl-4-(2'-aminophenyl)-1,4-dihydropyridine-3,5-dicarboxylic acid dimethyl ester 50 g. of 1,2,6-trimethyl-4-(2'-nitrophenyl)-1,4-dihydropyridine-3,5-dicarboxylic acid methyl ester are reduced in 500 ml. of methanol in the presence of 10 g. of Raney nickel under hydrogen (in a pressure autoclave at 70° to 80° C.), the mixture is suction-filtered when the absorption of hydrogen is terminated (1½ to 2 hours), and after cooling there are obtained 24 g. of pale yellow crystals of M.P. 191° C. Brief coronary dilating effect obtained with 5 mg./kg. i.v.

The 1,2,6-trimethyl-4-(3'-aminophenyl)-1,4-dihydropyridine-3,5-dicarboxylic acid diethyl ester has a M.P. of 134° to 136° C.; coronary dilating effect obtained with 5 to 10 mg./kg. i.v.

EXAMPLE 9

1,2,6-trimethyl-4-(3'-nitro-4'-hydroxyphenyl)-1,4-dihydropyridine-3,5-dicarboxylic acid diethyl ester After heating 8.5 g. of 3-nitro-4-hydroxy-benzaldehyde, 15 ml. of acetoacetic acid ethyl ester and 6 ml. of a 30% to 40% aqueous methylamine solution in 50 ml. of alcohol for several hours, concentrating the mixture by evaporation and adding ether, there are obtained 7 g. of yellow crystals of M.P. 142° C.; coronary dilating effect obtained with 3 mg./kg. i.v.

In the same way there were obtained:

(a) 1,2,6-trimethyl-4-(2'-nitro-5'-hydroxyphenyl)-1,4-dihydropyridine-3,5-dicarboxylic acid dimethyl ester of M.P. 237° C.; coronary dilating effect obtained with 3 to 10 mg./kg. i.v.
(b) 1,2,6-trimethyl-4-(2'-nitro-5'-hydroxyphenyl)-1,4-dihydropyridine-3,5-dicarboxylic acid diethyl ester of M.P. 197° C.; coronary dilating effect obtained with 10 mg./kg. i.v.
(c) 1,2,6-trimethyl-4-(4'-nitro-3'-hydroxyphenyl)-1,4-dihydropyridine-3,5-dicarboxylic acid dimethyl ester of M.P. 187° C.; coronary dilating effect obtained with 10 mg./kg. i.v.
(d) 1,2,6-trimethyl-4-(4'-nitro-3'-hydroxyphenyl)-1,4-dihydropyridine-3,5-dicarboxylic acid diethyl ester of M.P. 151° C.; coronary dilating effect obtained with 10 mg./kg. i.v.

EXAMPLE 10

1,2,6-trimethyl-4-(α-pyridyl)-1,4-dihydropyridine-3,5-dicarboxylic acid dimethyl ester After heating a solution of 20 ml. of pyridine-2-aldehyde, 50 ml. of acetoacetic acid methyl ester and 30 ml. of a 30% to 40% aqueous solution of methylamine in 100 ml. of methanol under reflux for 2 to 3 hours, the mixture is filtered with suction through animal charcoal and concentrated to half its volume. After the addition of ether and cooling, 5 g. of pale yellow crystals are obtained; white crystals of M.P. 160° to 162° C. from methanol.

The following compounds were also prepared:

(a) 1,2,6-trimethyl-4-(α-pyridyl)-1,4-dihydropyridine-3,5-dicarboxylic acid diethyl ester of M.P. 106° C.; coronary dilating effect obtained with 1 to 2 mg./kg. i.v.
(b) 1,2,6-trimethyl-4-(β-pyridyl)-1,4-dihydropyridine-3,5-dicarboxylic acid dimethyl ester of M.P. 190° C. (HCl salt); brief coronary dilating effect obtained with 3 to 5 mg./kg. i.v.
(c) N-isopropyl-2,6-dimethyl-4-(α-pyridyl)-1,4-dihydropyridine-3,5-dicarboxylic acid dimethyl ester of M.P. 131° C.
(d) N-allyl-2,6-dimethyl-4-(α-pyridyl)-1,4-dihydropyridine-3,5-dicarboxylic acid dimethyl ester of M.P. 106° C.; brief coronary dilating effect obtained with 2 mg./kg. i.v.
(e) 1,2,6-trimethyl-4-(α-pyridyl)-1,4-dihydropyridine-3,5-dicarboxylic acid diisopropyl ester of M.P. 115° C.; coronary dilating effect obtained with 2 mg./kg. i.v.
(f) 1,2,6-trimethyl-4-(α-pyridyl)-1,4-dihydropyridine-3,5-dicarboxylic acid-di-(β-methoxyethyl-ester) of M.P. 108° C.; coronary dilating effect obtained with 3 to 5 mg./kg. i.v.
(g) 1,2,6-trimethyl-4-(β-pyridyl)-1,4-dihydropyridine-3,5-dicarboxylic acid-di-(β-propoxyethyl-ester) of M.P. 58° C.; coronary dilating effect obtained with 1 to 2 mg./kg. i.v.
(h) 1,2,6-trimethyl-4-(α-pyridyl)-1,4-dihydropyridine-3,5-dicarboxylic acid-di-(β-propoxyethyl-ester) of M.P. 88° C.; coronary dilating effect obtained with 2 to 3 mg./kg. i.v.

What is claimed is:
1. A 1,4-dihydropyridine derivative of the formula:

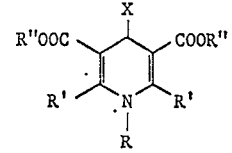

in which

R is a branched or straight-chain alkyl with 1 to 3 carbon atoms, or such alkyl having a double or triple bond or substituted by hydroxy or alkoxy, benzyl, or benyl substituted in the nucleus by one or more of the substituents halogen, alkyl, alkoxy;
R' is hydrogen or branched or straight-chain alkyl with 1 to 3 carbon atoms;
R" is branched or straight-chain, saturated alkyl with 1 to 4 carbon atoms, or such alkyl interrupted by oxygen or substitued by hydroxyl; and
X is phenyl substituted by at least one nitro or amino group or further substituted by halogen, alkyl, alkoxy or hydroxy, or α-, β- or γ-pyridyl.
2. The compound of claim 1 which is 1,2,6-trimethyl-4-(2'-nitrophenyl)-1,4-dihydropyridine-3,5-dicarboxylic acid dimethyl ester.
3. The compound of claim 1 which is 1,2,6-trimethyl-4-(2'-nitrophenyl)-1,4-dihydropyridine-3,5-dicarboxylic acid diethyl ester.
4. The compound of claim 1 which is 1,2,6-trimethyl-4-(2'-nitrophenyl)-1,4-dihydropyridine-3,5-dicarboxylic acid di-(β-hydroxyethyl)ester.
5. The compound of claim 1 which is 1-ethyl-2,6-dimethyl-4-(2'-nitrophenyl)-1,4-dihydropyridine-3,5-dicarboxylic acid dimethyl ester.
6. The compound of claim 1 which is 1,2,6-trimethyl-4-(3'-nitrophenyl)-1,4-dihydropyridine-3,5-dicarboxylic acid diethyl ester.
7. The compound of claim 1 which is 1,2,6-trimethyl-4-(4'-nitrophenyl)-1,4-dihydropyridine-3,5-dicarboxylic acid methyl ester.

8. The compound of claim 1 which is 1,2,6-trimethyl-4-(3'-nitrophenyl)-1,4-dihydropyridine - 3,5 - dicarboxylic acid-di-(β-propoxyethyl ester).

9. The compound of claim 1 which is 1,2,6-trimethyl-4-(2'-nitrophenyl)-1,4-dihydropyridine - 3,5 - dicarboxylic acid-di-(β-propoxyethyl ester).

10. The compound of claim 1 which is 1-isopropyl-2,6-dimethyl - 4 - (2'-nitrophenyl)-1,4-dihydropyridine-3,5-dicarboxylic acid dimethyl ester.

11. The compound of claim 1 which is 1-benzyl-2,6-dimethyl-4-(3'-nitro-6-chloro) - 1,4 - dihydropyridine-3,5-dicarboxylic acid diethyl ester.

12. The compound of claim 1 which is 1-benzyl-2,6-dimethyl - 4 - (4'-nitrophenyl)-1,4-dihydropyridine-3,5-dicarboxylic acid diethyl ester.

13. The compound of claim 1 which is 1-benzyl-2,6-dimethyl - 4 - (4'-aminophenyl)-1,4-dihydropyridine-3,5-dicarboxylic acid diethyl ester.

14. The compound of claim 1 which is 1-(β-hydroxyethyl) - 2,6 - dimethyl-4-(γ-pyridyl)-1,4-dihydropyridine-3,5-dicarboxylic acid diethyl ester.

15. The compound of claim 1 which is 1-(β-hydroxyethyl) - 2,6 - dimethyl-4-(β-pyridyl)-1,4-dihydropyridine-3,5-dicarboxylic acid diethyl ester.

16. The compound of claim 1 which is 1-benzyl-2,6-dimethyl - 4 - (α - pyridyl) - 1,4 - dihydropyridine - 3,5-dicarboxylic acid diethyl ester.

17. The compound of claim 1 which is 1-benzyl-2,6-dimethyl - 4 - (α - pyridyl) - 1,4 - dihydropyridine - 3,5-dicarboxylic acid di-tert.-butyric acid ester.

18. The compound of claim 1 which is 1-benzyl-2,6-dimethyl - 4 - (γ - pyridyl) - 1,4 - dihydropyridine - 3,5-dicarboxylic acid dimethyl ester.

19. The compound of claim 1 which is 1 - benzyl - 2,6-dimethyl - 4 - (γ - pyridyl) - 1,4 - dihydropyridine - 3,5-dicarboxylic acid diethyl ester.

20. The compound of claim 1 which is 1 - benzyl - 2,6-dimethyl - 4 - (γ - pyridyl) - 1,4 - dihydropyridine - 3,5-dicarboxylic acid isopropyl ester.

21. The compound of claim 1 which is 1 - (3',4' - dimethoxybenzyl) - 2,6 - dimethyl - 4 - (β - pyridyl) - 1,4-dihydropyridine-3,5-dicarboxylic acid diethyl ester.

22. The compound of claim 1 which is 1,2,6 - trimethyl-4 - (2' - aminophenyl) - 1,4 - dihydropyridine - 3,5-dicarboxylic acid dimethyl ester.

23. The compound of claim 1 which is 1,2,6 - trimethyl-4 - (3' - aminophenyl) - 1,4 - dihydropyridine - 3,5 - dicarboxylic acid diethyl ester.

24. The compound of claim 1 which is 1,2,6 - trimethyl-4 - (3' - nitro-4' - hydroxyphenyl) - 1,4 - dihydropyridine-3,5 - dicarboxylic acid diethyl ester.

25. The compound of claim 1 which is 1,2,6 - trimethyl-2 - (2' - nitro - 5' - hydroxyphenyl)-1,4-dihydropyridine-3,5 - dicarboxylic acid dimethyl ester.

26. The compound of claim 1 which is 1,2,6 - trimethyl-4 - (2' - nitro - 5' - hydroxyphenyl)-1,4-dihydropyridine-3,5 - dicarboxylic acid diethyl ester.

27. The compound of claim 1 which is 1,2,6 - trimethyl-4 - (4' - nitro - 3' - hydroxyphenyl)-1,4-dihydropyridine-3,5-dicarboxylic acid dimethyl ester.

28. The compound of claim 1 which is 1,2,6 - trimethyl-4 - (4' - nitro - 3' - hydroxyphenyl)-1,4-dihydropyridine-3,5-dicarboxylic acid diethyl ester.

29. The compound of claim 1 which is 1,2,6 - trimethyl-4 - (α - pyridyl) - 1,4 - dihydropyridine-3,5-dicarboxylic acid dimethyl ester.

30. The compound of claim 1 which is 1,2,6 - trimethyl-4 - (α - pyridyl) - 1,4 - dihydropyridine-3,5-dicarboxylic acid diethyl ester.

31. The compound of claim 1 which is 1,2,6 - trimethyl-4 - (β - pyridyl)-1,4-dihydropyridine-3,5-dicarboxylic acid dimethyl ester.

32. The compound of claim 1 which is N-isopropyl-2,6-dimethyl - 4 - (α - pyridyl) - 1,4-dihydropyridine-3,5-dicarboxylic acid dimethyl ester.

33. The compound of claim 1 which is N-allyl-2,6-dimethyl - 4 - (α - pyridyl) - 1,4 - dihydropyridine-3,5-dicarboxylic acid dimethyl ester.

34. The compound of claim 1 which is 1,2,6 - trimethyl-4 - (α - pyridyl) - 1,4 - dihydropyridine-3,5-dicarboxylic acid diisopropyl ester.

35. The compound of claim 1 which is 1,2,6 - trimethyl-4 - (α - pyridyl) - 1,4 - dihydropyridine-3,5-dicarboxylic acid-di-(β-methoxyethyl-ester).

36. The compound of claim 1 which is 1,2,6 - trimethyl-4 - (β - pyridyl) - 1,4 - dihydropyridine - 3,5 - dicarboxylic acid-di-(β-propoxyethyl-ester).

37. The compound of claim 1 which is 1,2,6-trimethyl-4 - (α - pyridyl) - 1,4 - dihydropyridine-3,5 - dicarboxylic acid-di-(β-propoxyethyl-ester).

References Cited
UNITED STATES PATENTS

| | | | |
|---|---|---|---|
| 3,485,847 | 12/1969 | Bossert et al. | 260—295.5 |
| 3,488,359 | 1/1970 | Bossert et al. | 260—295.5 |
| 3,441,648 | 4/1969 | Loev et al. | 260—295.5 |
| 3,511,847 | 5/1970 | Loev et al. | 260—295.5 |

ALAN L. ROTMAN, Primary Examiner

U.S. Cl. X.R.

424—266